R. HERNÁNDEZ & F. R. ORTEGA.
CIGAR HOLDER AND LIGHTER.
APPLICATION FILED FEB. 23, 1916.
1,275,154.
Patented Aug. 6, 1918.
2 SHEETS—SHEET 1.
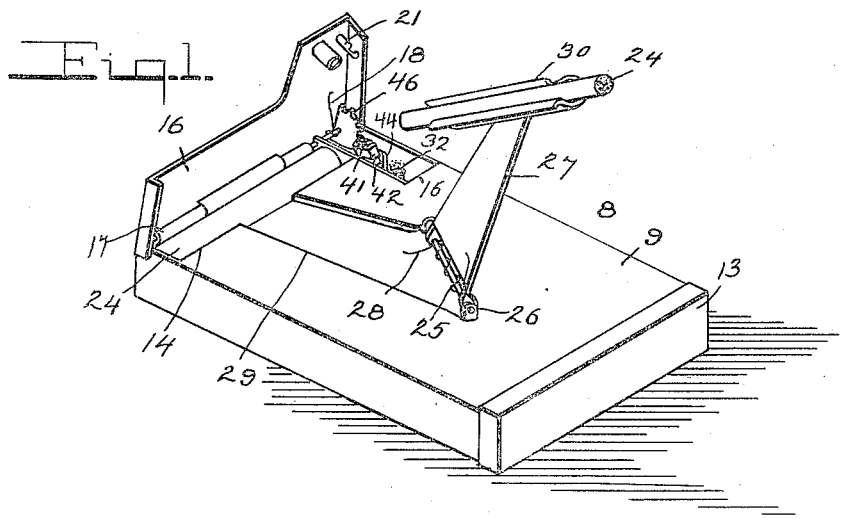
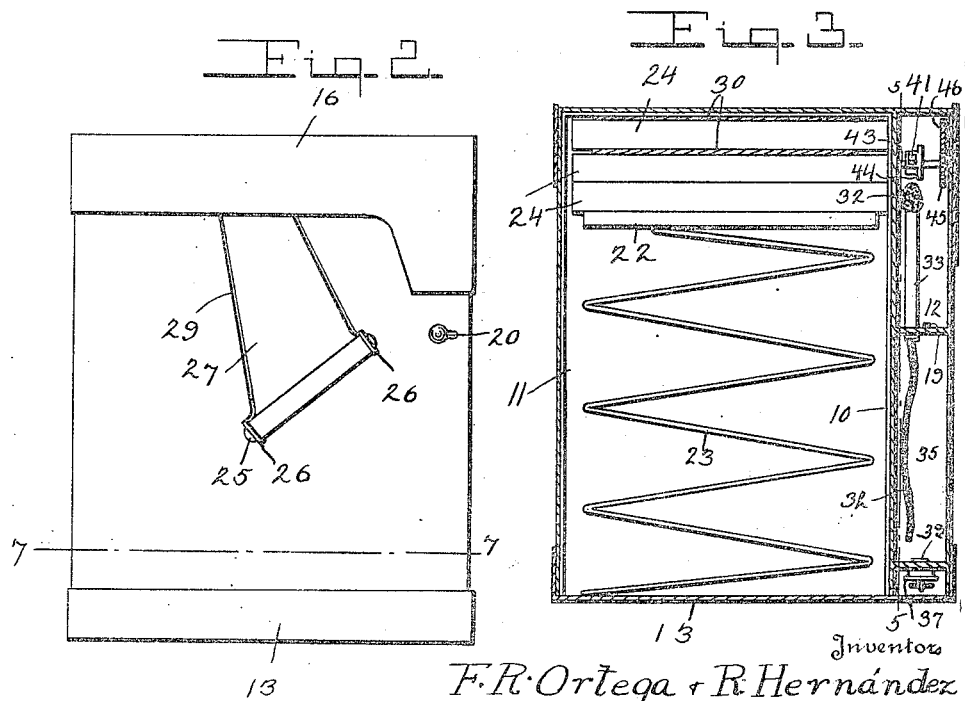

R. HERNÁNDEZ & F. R. ORTEGA.
CIGAR HOLDER AND LIGHTER.
APPLICATION FILED FEB. 23, 1916.
1,275,154.
Patented Aug. 6, 1918.
2 SHEETS—SHEET 2.
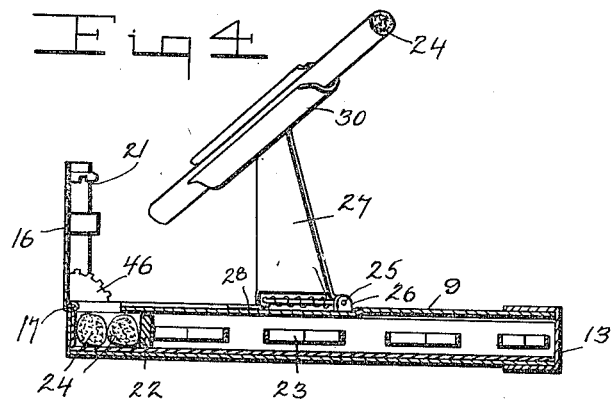
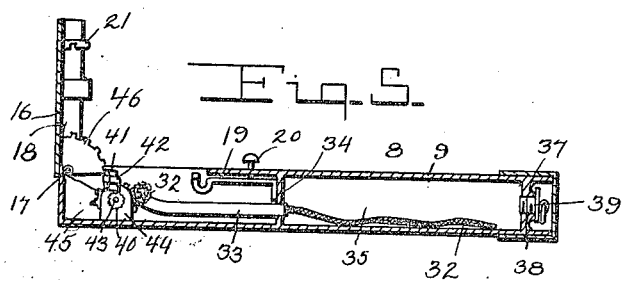
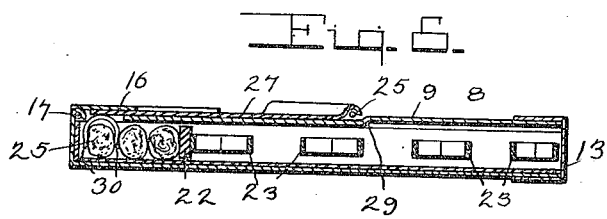
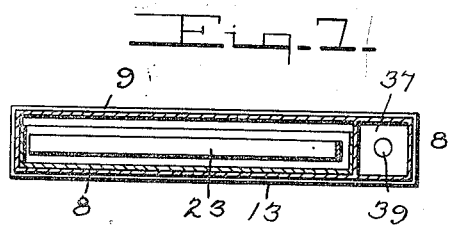

UNITED STATES PATENT OFFICE.

RAFAEL HERNÁNDEZ AND FÉLIX RODRIGUEZ ORTEGA, OF SANTI SPIRITUS, CUBA.

CIGAR HOLDER AND LIGHTER.

1,275,154. Specification of Letters Patent. Patented Aug. 6, 1918.

Application filed February 23, 1916. Serial No. 80,004.

*To all whom it may concern:*

Be it known that we, RAFAEL HERNÁNDEZ and FÉLIX R. ORTEGA, citizens of the Republic of Cuba, residing at Santi Spiritus, in the Republic of Cuba, have invented certain new and useful Improvements in Cigar Holders and Lighters; and we do hereby declare the following to be a full, clear, and exact description of the invention, such as will enable others skilled in the art to which it appertains to make and use the same.

This invention has for its object to provide an improved holder for containing cigars or cigarettes and embodying means automatically released simultaneously with the opening of the cover of the holder for picking cigars, one at a time, from the holder and delivering them to the smoker.

Another object is the provision of a cigar lighter operable by the hinged cover of the holder and including a wick located at a point adjacent the end of the cigarette or cigar delivered by the picker arm for lighting the cigar.

With these and other objects in view, the invention consists in the novel construction, combination and arrangement of parts as will be hereinafter specifically described, claimed and illustrated in the accompanying drawings, in which:

Figure 1 represents a perspective view of the improved holder and lighter,

Fig. 2 represents a top plan view thereof, the cover and picker arm being shown in closed position, Fig. 3 represents a longitudinal sectional view through the holder, Fig. 4 represents a longitudinal sectional view through the holder taken at right angles to Fig. 3, and illustrating the cover and picker arm in open or released position, Fig. 5 represents a longitudinal sectional view on the line 5—5 of Fig. 3, Fig. 6 represents a longitudinal sectional view similar to Fig. 4, illustrating the cover and picker arm in closed position, and Fig. 7 represents a transverse sectional view through the holder.

Referring to the drawings in detail, wherein similar reference numerals designate corresponding parts throughout the several views, the numeral 8 indicates generally the body of the holder, including the top 9 and a longitudinal partition 10 arranged adjacent one side wall of the holder and dividing the interior of the latter into two relatively large and small chambers 11 and 12, respectively. One end of the body 8 is open and a removable cap 13 is fitted thereover and the end of the top 9 opposite the open end of the body is cut away to provide an opening 14, having the end adjacent the chamber 12 enlarged, as indicated at 15. A lid or cover 16 is hingedly secured by a hinge rod 17 to the closed end of the body 8 and is normally retained in open position by the tension of a spring 18. The cover 16 is locked in closed position by a spring fastening member 19 secured in the chamber 12 and having an operating portion 20 connected therewith, whereby the member 19 may be disengaged from the keeper 21 carried by the cover 16.

A follower plate 22 is movable longitudinally in the chamber 11 and is normally retained extended toward the opening 14 by the tension of a spring 23 confined between the follower plate 22 and the removable cap 13. The follower plate 22 is adapted to engage the cigars or cigarettes 24 placed in the holder and push them under the opening 14 in the top 9.

A hinge rod 25 is supported in a pair of apertured ears 26 secured to the top 9 and pivotally secures a picker arm 27, which latter is normally retained in vertical position or angularly with relation to the top 9 by the tension of a spring 28. When closed, the picker arm 27 engages in a depression 29 formed in the top 8.

A cigar picker or holder 30 formed of spring sheet metal and substantially U-shaped in cross section is secured to the free end of the picker arm 27 and is adapted, when the picker arm is closed, to project into the opening 14 and resiliently embrace or grip a cigar or cigarette 24 disposed in the opening 14. As clearly illustrated in Fig. 1, the hinge rod 25 of the picker arm 27 is arranged angularly with relation to the transverse opening 14 in the top 9, and thus when the picker arm is swung outwardly to released position, as illustrated in Fig. 1, the cigar or cigarette 24 engaged in the spring picker or holder 30 is supported in an inclined position, one end thereof being disposed directly over the enlarged end 15 of the opening and in position to be lighted by the flame from a wick 32.

The wick 32 is positioned in a wick tube 33 secured in a transverse partition 34 arranged in the chamber 12 and providing a liquid fuel reservoir 35, into which the inner end of the wick 32 extends. The end of the fuel reservoir 35 opposite the partition 34 is closed by an end wall 37, having a filling opening 38 therein adapted to be closed by a removable plug 39.

The end of the wick 32 disposed in the opening 15 is ignited by sparks produced by a spur wheel 40 operating against a piece of flint 41 engaged in a holder 42. The holder 42 and shaft 43 carrying the spur wheel 40 are supported in a bearing 44 secured to the bottom of the body 8. A gear wheel 45 is mounted upon the shaft 43 and meshes with a gear segment 46 arranged concentrically with relation to the hinge rod 17 and rigidly fastened to the cover 16, whereby when the latter is released and automatically opened by the tension of a spring 18 the gear segment 46 is operated and the gear wheel 45 and spur wheel 40 rotated.

The body 8 may be conveniently loaded with cigars or cigarettes by removing the cap 13 and spring actuated follower 22 and subsequently replacing these parts. The cigars 24 are automatically pushed into position in the opening 14 as they are successively removed by the spring actuated follower 22 and, when the cover 16 is released it is automatically opened by the tension of the spring 18, thereby releasing the picker arm 27 and permitting the latter to swing outwardly to operate under the influence of the spring 28, the picker or holder 30 carrying therewith a cigar 24, as clearly illustrated in Fig. 1. During the opening movement of the cover 16 the spur wheel 40 is actuated by the gear segment 46, gear wheel 45 and shaft 43, thereby igniting the protruding end of the wick 32 and producing a flame which ignites the tip of the cigar 24.

What we claim is:

1. A cigar holder including a body having an opening in its top wall at one end thereof, said wall also having a depression communicating with the opening, a picker arm carried by the body and located in the depression, and a spring picker or holder carried by said arm and movable into said opening of the body.

2. A cigar holder including a hollow body having an opening in its top wall at one end thereof, said top wall also provided with a depression communicating at one end with the opening, a spring operated picker arm pivotally secured to the body and located in the depression, and a spring picker or holder carried by the free end of said arm and movable into said opening.

3. A cigar holder including a hollow body having an opening in its upper wall at one end thereof, a depression formed in said upper wall and communicating with said opening, a spring actuated picker arm pivotally secured to said body and located in the depression, a spring picker or holder carried by the free end of said arm and movable into said opening, and means for securing said arm in closed position and inclosing said opening of the hollow body.

4. A cigar holder including a hollow body having an opening in its upper wall at one end thereof, said wall also provided with a depression in its upper side and communicating at one end with the opening, a spring actuated picker arm pivotally secured to the front wall of said depression, a spring picker or holder carried by the free end of said arm and movable into said opening, and a cover hingedly secured to the upper edge of one wall of said body and adapted to close said opening and so arranged as to move into engagement with the picker arm to hold it in closed or inoperative position.

5. A cigar holder including a hollow body having an opening in its upper wall at one end thereof, said upper wall also provided in its upper side with a depression communicating at one end with the opening, a cover hingedly secured to one end wall of the hollow body and closing said opening, a cigar lighter located in said hollow body, said lighter being connected to said cover for operation by the opening of said cover, a spring actuated picker arm pivotally secured to the upper side of said body and in said depression, a spring picker or holder carried by the free end of said arm and movable into said opening, said arm being so arranged as to carry a cigar supported therein to position it over said lighter when in raised position, said cover adapted to engage said picker arm to retain the same in the opening and in inoperative position.

In testimony whereof we affix our signatures in presence of two witnesses.

RAFAEL HERNÁNDEZ.
FÉLIX RODRIGUEZ ORTEGA.

Witnesses:
S. MARLINE,
V. VELÁZQUE.